United States Patent [19]

Harris et al.

[11] Patent Number: 5,008,334

[45] Date of Patent: Apr. 16, 1991

[54] RESINS OF EPOXY/AROMATIC DIOL COPOLYMER AND BLOCK COPOLYMER OF EPOXY/AROMATIC DIOL COPOLYMER AND A EPOXY-CAPPED POLYBUTADIENE (CO)POLYMER

[75] Inventors: Paul J. Harris, West Bloomfield; Ronald T. Wojcik, Rochester Hills, both of Mich.

[73] Assignee: BASF Corporation, Southfield, Mich.

[21] Appl. No.: 316,845

[22] Filed: Feb. 28, 1989

[51] Int. Cl.$^5$ ............... C08G 59/14; C08G 63/66; C08L 63/10

[52] U.S. Cl. ............... 525/109; 525/91; 525/92

[58] Field of Search ............... 525/91, 92, 109

[56] References Cited

U.S. PATENT DOCUMENTS

| | | | |
|---|---|---|---|
| 3,799,854 | 3/1974 | Jerabek | 204/181 |
| 3,914,334 | 10/1975 | Lubowitz et al. | 260/836 |
| 3,925,180 | 12/1975 | Jerabek | 204/181 |
| 3,936,405 | 2/1976 | Sturni et al. | 204/181 |
| 3,947,339 | 3/1976 | Jerabek et al. | 204/181 |
| 3,962,165 | 6/1976 | Bosso et al. | 260/292 EP |
| 3,984,299 | 10/1976 | Jerabek | 204/181 |
| 4,031,050 | 6/1977 | Jerabek | 260/292 TN |
| 4,071,428 | 1/1978 | Bosso et al. | 204/181 C |
| 4,093,594 | 6/1978 | Anderson | 260/47 EP |
| 4,116,900 | 9/1978 | Belanger | 260/18 EP |
| 4,134,864 | 1/1979 | Belanger | 260/18 EP |
| 4,137,140 | 1/1979 | Belanger | 204/181 C |
| 4,139,510 | 2/1979 | Anderson | 260/18 N |
| 4,182,831 | 1/1980 | Hicks | 528/103 |
| 4,284,574 | 8/1981 | Bagga | 260/348.43 |
| 4,336,344 | 6/1982 | Craigie | 525/31 |
| 4,362,847 | 12/1982 | Kooijmans et al. | 525/172 |
| 4,486,571 | 12/1984 | Holubka | 525/109 |
| 4,513,125 | 4/1985 | Holubka | 525/528 |
| 4,529,755 | 7/1985 | Nishikawa et al. | 523/436 |
| 4,530,945 | 7/1985 | Christenson et al. | 523/400 |
| 4,565,852 | 1/1986 | Qaderi | 525/528 |
| 4,605,690 | 8/1986 | Debroy et al. | 523/414 |
| 4,612,338 | 9/1986 | Chung et al. | 523/414 |
| 4,617,348 | 10/1986 | Dickie et al. | 525/112 |
| 4,639,493 | 1/1987 | Dickie et al. | 525/113 |
| 4,657,979 | 4/1987 | Dickie et al. | 525/113 |
| 4,720,523 | 1/1988 | Dickie et al. | 525/113 |

FOREIGN PATENT DOCUMENTS

| | | | |
|---|---|---|---|
| 56-115346 | 9/1981 | Japan . | |
| 57-70119 | 4/1982 | Japan | 525/109 |
| 58-017160 | 2/1983 | Japan . | |

Primary Examiner—Melvyn I. Marquis
Assistant Examiner—Robert E. L. Sellers, II
Attorney, Agent, or Firm—Jerry F. Janssen; Cary W. Brooks

[57] ABSTRACT

The present invention provides a resin which is a mixture of (a) the product of a diol and one or more diepoxides and (b) an A-B-A block copolymer wherein A represents blocks of an epoxy/diol copolymer which is the reaction product of a diol and a diepoxide, and B represents blocks of an epoxy-capped, carboxyl-terminated polybutadiene or polybutadiene/acrylonitrile copolymer.

Amine resins, produced by reaction of this resin with an amine are useful as the principal resin in electrocoating formulations which produce deposited films having excellent corrosion resistance and improved impact and chip resistance.

34 Claims, No Drawings

RESINS OF EPOXY/AROMATIC DIOL COPOLYMER AND BLOCK COPOLYMER OF EPOXY/AROMATIC DIOL COPOLYMER AND A EPOXY-CAPPED POLYBUTADIENE (CO)POLYMER

TECHNICAL FIELD

The present invention relates to resins comprising mixtures of the reaction product of a diol and one or more diepoxides and A-B-A block copolymer resins which comprises blocks of oligomeric adducts of diols and diepoxides and blocks of epoxy-capped, carboxyl terminated polybutadiene or polybutadiene/acrylonitrile, to the amine resins thereof, and to compositions which can be used in electro-deposition baths to produce the corresponding hardened resins.

BACKGROUND ART

Cathodic electrodeposition of a film composed of an amine resin, crosslinker, pigment and other resinous components onto an electrically conductive article is an important industrial process. It constitutes the usual manner in which automobile, truck, and bus bodies as well as other large metallic surfaces are primed with paint. In addition to providing a painted surface, the resin systems employed protect the underlying metal surface from corrosion, impact damage and other detrimental exposure to environmental conditions.

In performing the electrodeposition, the conductive article forms one electrode of a direct current circuit and is immersed in a coating ba made from an aqueous dispersion of the film-forming resin and other components. A direct electrical current is passed between the article and a counter-electrode contained in the electrodeposition bath. An electrical charge on the article causes the deposition of the resins and other components of the bath on the article so as to produce an electrodeposited film. The deposited film is then baked or otherwise hardened to yield a coating of substantially uniform thickness and protective characteristics.

Generally, protection from the environment and other adverse conditions is accomplished by designing into the coating resins such chemical characteristics as adhesion, flexibility, strength, hardness, and inertness toward reaction with environmental chemicals. Each of the characteristics manifests itself in the protective properties of the hardened coating.

A number of advances in the protective properties of electrodeposition systems have been described in the patent literature. For example U.S. Pat. Nos. 4,486,571; 4,513,125; 4,565,852; 4,617,348; 4,639,493; 4,657,979; and 4,720,523, the disclosures of which are incorporated herein by reference, describe various dienemodified epoxy resins or cross-linking agents designed for the improvement of the properties of electrodeposition systems.

One particular problem of electrodeposited films relates to impact and chip resistance. The electrodeposited film provides a first line of defense against corrosion of the underlying metal substrate, while simultaneously withstanding impact damage which results in chipping of the overlying decorative layers of coatings as well as delamination of the electrodeposited film from the underlying metal surface. The difficulty lies in chemically designing an electrocoat composition which maximizes both desired effects. Electrodeposited films which possess the requisite flexibility to withstand the shock of impact generally do not, at the same time, possess the required corrosion resistance nor adhere well to overlying layers of decorative coating and are thus more susceptible to chipping. Conversely, electrodeposited films which possess the desired adherence to other coating layers often are hard and do not respond well under impact.

It is therefore an objective of the present invention to provide a principal resin system for use in electrodeposition coating which possesses both high corrosion resistance while simultaneously providing improved impact strength and excellent adherence to the substrate and conventional top coating films.

SUMMARY OF THE INVENTION

In accordance with the present invention, there is provided a resin which is a mixture of (a) the reaction product of a diol and one or more diepoxides, and (b) an A-B-A block copolymer wherein A represents blocks of an epoxy/diol copolymer which is the reaction product of a diol and one or more diepoxides; and B represents blocks of an epoxy-capped, carboxyl-terminated polybutadiene or polybutadiene/acrylonitrile copolymer.

The resin has a weight per epoxide (WPE) of between about 1000 and 3000, and comprises from about 5% to about 25% by weight B block content, based on total resin. When reacted with an amine to produce an amine resin, the resins of this invention are useful as principal resins in aqueous electrocoat formulations and result in deposited electrocoat films having excellent corrosion resistance and improved impact and chip resistance.

DETAILED DESCRIPTION AND BEST MODE FOR CARRYING OUT THE INVENTION

The electrocoat compositions of the present invention comprise a principal resin emulsion; a grind resin formulation comprising a grind resin, one or more pigmenting agents; and one or more cross-linking agents.

Principal Resin

The principal resins of the present invention comprises a mixture of (a) the reaction product of a diol and one or more diepoxides, and (b) an A-B-A block copolymer in which A represents blocks of an epoxy/diol copolymer and B represents blocks of an expoxy-capped, carboxyl-terminated polybutadiene or polybutadiene/acrylonitrile copolymer.

The A blocks of the principal resin comprise a copolymers of diol and diepoxide. The diepoxide is selected from diepoxide $E^1$, diepoxide $E^2$, and mixtures of diepoxides $E^1$ and $E^2$ wherein the amount of diepoxide $E^1$ in the mixture ranges from 0% to 100%.

The principal resins possess an equivalent weight per epoxide (WPE) of between about 1000 and about 3000, preferably between about 1200 and about 1600. To optimize impact resistance and intercoat adhesion of the final principal resin, the percentage polybutadiene or polybutadiene/acrylonitrile B blocks in the resins lies between about 5 weight percent and 25 weight percent, preferably about 15 weight percent of the total resin. The B blocks may be blocks of epoxy-capped, carboxyl-terminated butadiene homopolymer, or may be blocks of epoxy-capped, carboxyl-terminated butadiene/acrylonitrile copolymer. In the latter instance, the amount of acrylonitrile present in the butadiene/a- crylonitrile copolymer blocks may range up to about 40%, preferably about 10-20%.

The principal resins of this invention are prepared generally by reacting the following ingredients:
(a) a diol
(b) an epoxide-capped polybutadiene or polybutadiene/acrylonitrile copolymer
(c) one or more diepoxides
so as to achieve the desired WPE of about 1000 to about 3000, preferably about 1200 to about 1600 and a B block content of the total resin from about 5 weight percent to about 25 weight percent, preferably about 15 weight percent.

The formation of the resin proceeds by reaction of the terminal epoxy groups of the epoxy-capped, carboxyl terminated polybutadiene or polybutadiene/acrylonitrile starting material with the diol and diepoxide in the mixture to form the A-B-A block copolymer. Simultaneously, a separate reaction occurs between the diol and diepoxide to form a diol/epoxide polymer. The final resin is thus a mixture of the diol/epoxy polymers and the A-B-A block copolymers.

The amounts of each starting material employed to achieve these desired results depends upon a number of interrelated factors and may be arrived at in each instance by resorting to the following steps of calculation:

Step 1—Decide upon the weight of principal resin (G) to be produced.

Step 2—Decide upon the weight of epoxy-capped, carboxyl-terminated polybutadiene or polybutadiene/acrylonitrile copolymer (P) to be used. (This figure reflects the weight percent of the total finished resin which is contributed by the B block and will depend upon both the percent B block desired in the final principal resin and the percent polybutadiene or polybutadiene/acrylonitrile in the starting material employed.)

Step 3—Determine by conventional chemical means (such as titration) the WPE of the epoxy-capped, carboxyl-terminated polybutadiene or polybutadiene/acrylonitrile copolymer (W).

Step 4—Determine by conventional chemical means (such as titration) the WPE of the diepoxide (D). If a mixture of two diepoxides $E^1$ and $E^2$ is used, a weighted average of the two WPE values is used.

Step 5—Determine the equivalent weight of the diol (F).

Step 6—Decide upon the desired final WPE for the principal resin (H).

Step 7—Calculate the excess of equivalents of epoxide group over diol in the mixture (I): $I = G/H$ Step 8—Calculate the number of equivalents (J) of epoxy-capped, carboxyl-terminated polybutadiene or polybutadiene/acrylonitrile copolymer: $J = P/W$.

Step 9—Calculate the weight of diol plus diepoxides to be used in the reaction mixture (K):

$$K = G - P.$$

Step 10—Calculate the number of equivalents of diepoxide (L) in the reaction mixture:

$$L = F + D.$$

Step 11—Calculate the weight of diepoxide to be used in the reaction mixture (C)

$$C = \frac{\{[D * F(I * J)] + (D * K)\}}{L}$$

Step 12—Calculate the weight of diol (E) to be used in the reaction mixture: $E = G - P - C$ The following example is merely illustrative of the use of the computational method detailed above in the preparation of a principal resin in accordance with this invention. In this illustrative example, the following assumption are made:

Step 1—A batch of 1000 g of principal resin is to be made. G = 1000 g.

Step 2—The desired polybutadiene/acrylonitrile content of the final polymer is to be 15 weight percent. The starting material selected is Wilmington Chemical Company WC-8006 which contains 40 weight percent polybutadiene/acrylonitrile copolymer and 60% diglycidyl ether of bisphenol A as reactant/diluent.

$$P = \frac{(1000 \text{ g})(0.15)}{0.40} = 375 \text{ g}$$

Step 3—The WPE of the epoxy-capped, carboxyl-terminated polybutadiene or polybutadiene/acrylonitrile copolymer is determined experimentally to be 350: W = 350.

Step 4—For this example, a 50%/50% mixture of diepoxide $E^1$ having a WPE of 125 and diepoxide $E^2$ having a WPE of 350 is selected. The WPE for the mixture is taken to be the average of the two, 237.5. Thus D = 237.5 and $$L = F + D = 55 + 237.5 = 292.5$$

Step 5—For this example, the diol chosen is hydroquinone, equivalent weight = 55: F = 55.

Step 6—The desired WPE of the final resin is 1200: H = 1200.

Step 7—I = G/H = 1000/1200 = 0.833
Step 8—J = P/W = 375/350 = 1.071
Step 9—K = G − P = 1000 − 375 = 625
Step 10—L = F + D = 55 + 237.5 = 292.5

$$\begin{aligned} \text{Step 11} - C &= \frac{\{[D * F(I - J)] + (D * K)\}}{L} \\ &= \frac{\{[237.5 * 55(0.833 - 1.071)] + (237.5 * 625)\}}{292.5} \\ &= 496.9. \end{aligned}$$

$$\begin{aligned} \text{Step 12} - E &= G - P - C \\ &= 1000 - 375 - 496.9 \\ &= 128.1 \end{aligned}$$

The reaction mixture for the example illustrated above would thus initially contain 375 g of WC-8006 (of which 225 g comprises the diglycidyl ether of bisphenol A and 150 g comprises epoxy-capped, carboxyl-terminated polybutadiene/acrylonitrile copolymer); ob 496.9 g of a mixture of diepoxide $E^1$ and diepoxide $E^2$ and 128.1 g of hydroquinone. The resulting resin will comprise about 15 weight percent B block polybutadiene/acrylonitrile copolymer.

General Synthetic Method for Preparing the Principal Resin

The reaction is carried out generally by charging the reaction vessel with the epoxy-capped, carboxyl-terminated polybutadiene or polybutadiene/acrylonitrile prepolymer, the diepoxide or mixture of diepoxides, the diol, and a non-polar, aprotic solvent such as toluene. The reaction mixture is slowly heated with mechanical stirring to a temperature of about 120° C. under a flow of nitrogen gas. When a temperature of about 120° C. is reached, about 0.05 weight percent of triphenylphosphine catalyst is added to the reaction vessel contents to catalyze the reaction. At this point, the reaction mixture generally undergoes an exothermic reaction and the temperature is maintained at or below about 160° C. When the initial exothermic reaction has subsided, the mixture is again heated to maintain the temperature at about 150° C. Samples are withdrawn periodically from the reaction mixture and the WPE of the mixture is determined. When the desired WPE value has been reached, typically after about three hours reaction time, the temperature of the mixture is reduced to about 90° C.

The desired end-capping amine of the principal resin is then added to the reaction vessel contents, and the temperature of the resulting exothermic reaction is kept below about 15° C. with cooling. When the exothermic reaction has subsided, the mixture is heated for an additional one hour at a temperature of about 100°-110° C. At the end of this time, the mixture is cooled and an appropriate solvent such as methyl iso-butyl ketone is added and the product is removed from the reaction vessel and allowed to cool to room temperature.

Starting Materials–Diol

The epoxy/diol copolymer blocks are formed by reacting one or more diepoxides with a diol. Diols which are useful for this purpose are generally selected from phenolic alcohols. By the term phenolic alcohols as used throughout this specification and appended claims is meant any compound in which the hydroxyl functional group is directly attached to an aromatic carbocyclic ring or a substituted aromatic carbocyclic ring. Compounds which may be employed in the formulation of the epoxy/diol copolymer blocks of the principal resin are selected from bis-(hydroxy aryl) alcohols, and monoaryl diols.

Examples of bis-(hydroxy aryl) alcohols include those compounds in which two hydroxyl groups are attached to $Ar^1$, where $Ar^1$ is defined as two or more aromatic carbocyclic rings which are fused, are connected by a valence bond, or are connected by a branched or unbranched divalent alkylene group containing from 1 to 3 carbon atoms or carbonyl. The group $Ar^1$ may be optionally further substituted with alkyl of from one to four carbon atoms, alkoxy of from one to four carbon atoms, phenyl, alkylphenyl in which the alkyl group contains from one to four carbon atoms, or halogen.

Representative compounds include 1,5-, 1,6-, 1,7-, 1,8-, 2,5-, 2,6-, 2,7-, and 2,8-dihydroxyanthracene; 1,5-, 1,6-, 1,7-, 1,8-, 2,5-, 2,6-, 2,7-, and 2,8-dihydroxy-naphthalene, 2,2'-, 2,3'-, 2,4'-, 3,3'-, 3,4'-, and 4,4'-dihydroxybiphenyl; and 2,2''-, 2,3''-, 2,4''-, 3,3''-, 3,4''-, and 4,4''-dihydroxyterphenyl, bis-(hydroxyphenyl)methane, bis-(hydroxyphenyl)ethane, bis-(hydroxyphenyl)propane, bisphenol A, p,p'-dihydroxy-benzophenone, or any of the foregoing substituted by methyl, ethyl, n-propyl, iso-propyl, n-butyl, iso-butyl, sec-butyl, tert-butyl, methoxyl, ethoxyl, n-propoxyl, iso-propoxyl, n-butoxyl, iso-butoxyl, sec-butoxyl, tert-butoxyl, or halogen.

Monoaryl diol alcohols which may be employed in the synthesis of the epoxy/diol copolymer blocks of the principal resins of the present invention comprise compounds in which two hydroxyl groups are attached to $Ar^2$, where $Ar^2$, is defined as a phenylene group or phenylene group substituted with alkyl, alkoxyl of from one to four carbon atoms, phenyl, alkylphenyl in which the alkyl group contains from one to four carbon atoms, or halogen. Representative compounds of this class include resorcinol, hydroquinone, and catechol, as well as substituted forms thereof. Preferred diols are hydroquinone and bisphenol A.

Starting Materials—Diepoxide

The diepoxide compounds useful for formulating the epoxy/diol copolymer blocks of the principal resins of this invention are selected from either of two general classes or mixtures thereof. One class of diepoxide, $E^1$, comprises compounds having the structure

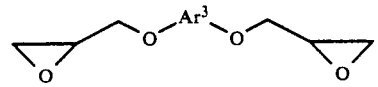

wherein $Ar^3$ is selected from the group selected from $Ar^1$ and $Ar^2$ as defined above. Preferred diepoxides of class $E^1$ are the diglycidyl ether of bisphenol A and the diglycidyl ether of hydroquinone.

The second class of diepoxide, $E^2$, comprises compounds having the structure

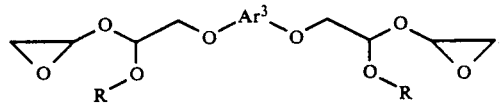

wherein $Ar^3$ is as defined above and R is alkyl of from one to six carbon atoms or alkoxyalkyl of from two to twelve carbon atoms. A preferred diepoxides of class $E^2$ useful in the practice of this invention is 2,2-bis-[p-(3-butoxy-2-glycidyloxypropyloxy)phenyl]propane. This corresponds to compound $E^2$ in which $Ar^3$ is 2,2-diphenylpropane and R is n-butyl.

The synthesis of the diepoxide compounds of class $E^1$ follow procedures generally known in the art. Epihalohydrins such as epichlorohydrin, epibromohydrin, or epiiodohydrin are reacted with the desired diol precursor to form the bis-glycidyl ether. The reaction is generally carried out in a polar, aprotic solvent in the presence of an acid scavenger such as aqueous sodium hydroxide or similar hydroxide base under about stoichiometric proportions and at a temperature of from about 0° C. to about 100° C., preferably at about ambient temperature.

Diepoxide compounds of class $E^2$ are prepared by methods detailed in U.S. Pat. No. 4,284,574, the disclosure of which is incorporated herein by reference. The process involves first reacting two moles of an alcohol or alkoxy alcohol with one mole of the desired diglycidyl ether of formula $E^1$ above This step is carried out in the presence of a basic catalyst such as a tertiary amine, a quaternary ammonium salt, or an alkali metal hydroxide, generally at temperatures between about 80° C. and 180° C. in the absence of a solvent.

The product of this reaction is then further reacted with about 1.8 to 2.2 moles of epichlorohydrin in the presence of a Lewis acid catalyst such as stannic chloride, or boron trifluoride or a complex thereof. This reaction results in a bis-chlorohydrin which is then reacted with sodium hydroxide in the usual manner to form the diepoxides of formula $E^2$ above.

Starting Materials—Epoxy-Capped, Carboxyl-Terminated Polybutadiene or Polybutadiene/Acrylonitrile Prepolymers In the principal resin of this invention, the B blocks comprise epoxy-capped, carboxyl-terminated polybutadiene or carboxyl-terminated polybutadiene/acrylonitrile copolymer having a number average molecular weight in the range of about 3000–4000 and in which the carboxyl groups have been further reacted with the diglycidyl ether of bisphenol A. These prepolymers are prepared by reacting carboxyl-terminated polybutadiene or carboxyl-terminated polybutadiene/acrylonitrile copolymers with an excess of the diglycidyl ether of bisphenol A so that no free carboxyl groups remain at the end of the reaction. The resulting material is thus a mixture of the epoxy end-capped prepolymer and free bisphenol A as a diluent/reactant.

The carboxyl-terminated polybutadiene and polybutadiene/acrylonitrile copolymers useful as starting materials in the preparation of the B block prepolymers are commercially available as Hycar® resins from B.F. Goodrich Specialty Polymers & Chemicals Division, 6100 Oak Tree Blvd , Cleveland, Ohio. These carboxyl-terminated Hycar® resins comprise butadiene and acrylonitrile which are copolymerized to form a copolymer in which the weight percentage acrylonitrile, based on total polymer weight, ranges from 0% to 26% and has a number average molecular weights in the range of from about 3200 to about 4200. Hycar® resins useful in the practice of this invention are listed in Table 1.

TABLE 1

| Hycar ® Resin | Number Average Molecular Weight Mn | Acrylonitrile Content (Percent) |
|---|---|---|
| CTB 2000X165 | 3,800 | 0 |
| CTB 2000X162 | 4,200 | 0 |
| CTBN 1300X31 | 3,800 | 10 |
| CTBN 1300X8 | 3,600 | 18 |
| CTBN 1300X13 | 3,200 | 26 |
| CTBN 1300X9 | 3,600 | 18 |

The preferred starting material for preparing the expoxy-capped, B copolymer blocks of the principal resins of this invention are carboxyl-terminated polybutadiene/acrylonitrile copolymers having from about 15% to about 25% acrylonitrile content. A particularly preferred material is Hycar® CTBN 1300X8, having an acrylonitrile content of about 18%.

As stated above, the carboxyl-terminated polybutadiene or carboxyl-terminated polybutadiene/acrylonitrile copolymers listed above are end-capped by reaction with an excess of diepoxide such as the diglycidyl ether of bisphenol A. The resulting prepolymers are commercially available from Wilmington Chemical Corporation, P.O. Box 66, Wilmington, Del. 19899, and contain varying amounts of excess diglycidyl ether of bisphenol A is a diluent/reactant. Preferred resins of this type useful in the practice of this invention are listed in Table 2.

TABLE 2

| Wilmington Resin | Hycar ® Resin | Percent DGEBA in Mixture |
|---|---|---|
| WC-8005 | CTBN 1300X13 | 60 |
| WC-8006 | CTBN 1300X8 | 60 |

Starting Materials—End-Capping Amines

Amines useful for end-capping the resins of this invention, leading to the formation of amine resins, include ammonia, and mono- and poly- primary, secondary, and tertiary amines as well as mono- and poly- amines which contain mixtures of primary, secondary, and tertiary amine groups. Heterocyclic amines and physical mixtures or chemical mixtures of these amines may also be used. Optionally, these amines may contain other chemical functional groups such as hydroxyl, amide, carboxylic acid, ether, thiol, thioether, or alkoxyl groups. The amine preferably contains from one to five amine groups. When tertiary amine groups are present, it is preferable that primary or secondary amine groups are also present.

The organic radicals substituting the mono- or poly-primary, secondary or tertiary amines may be aliphatic, unsaturated, alicyclic, aromatic carbocyclic, aliphatic-substituted aromatic, aromatic-substituted aliphatic, or heterocyclic in nature. Generally, the aliphatic or unsaturated radicals are of from one to ten carbon atoms. Aromatic radicals include mono- or polyphenylene groups or naphthalene groups, any of which may be optionally substituted with one or more lower alkyl or lower alkoxy groups.

When polyamines are employed, amine groups may both terminate the amine compound and may be present within the chain structure of the amine compound. Exemplary of suitable aliphatic and alicyclic diamines useful for forming amine resins of the present invention include 1,2-ethylene diamine; 1,2-propylene diamine; 1,8-menthane diamine; isophorone diamine; propane-2,2-cyclohexyl amine; and triethylene tetramine.

Mixed amines in which the radicals are of different types may also be employed as, for example, with mixed aromatic and aliphatic radicals. Other functional groups, such as alkyl, alkoxy, hydroxyl, halo-, or nitroso may also optionally be attached to the organic radicals.

Aromatic diamines such as phenylene diamines and toluene diamines can be employed as, for example, p-phenylene diamine, p-toluenediamine. N-alkyl and N-aryl derivatives of the above types of amines may also be employed as, for example, N,N-dimethyl-o-phenylene diamine, N,N-di-p-tolyl-m-phenylene diamine and p-aminodiphenylamine.

Polynuclear aromatic diamines may also be employed in which the aromatic rings are attached by means of a valence bonds as, for example in 4,4′-biphenyl diamine, methylene dianiline, and monochloromethylene dianiline.

Besides the amines mentioned above, hydrazines, hydrazides, aminoalcohols, mercapto-terminated derivatives of amine, and amino acids may also be employed. Examples of the foregoing include monoethanolamine, p-aminobenzoic acid, aminopropionic acid, N-(hydroxyethyl)ethylene diamine, anthranilic acid, p-aminophenol, aminostearic acid, and β-aminobutyric acid.

When amino acids are used as the amine to form amino resins of this invention, the conditions should be adjusted to release reactive amine groups from Zwitterionic complexes.

Further amines which can be used to prepare amino resins of this invention include dialkylmonoamines of from 1 to 6 carbon atoms in each alkyl group; hydroxyalkyl alkyl amines and dihydroxyalkyl amines having from 1 to 6 carbon atoms in each alkyl or hydroxyalkyl group; di-, tri-, tetra-, and pentaamines optionally substituted with alkyl groups of from 1 to 6 carbon atoms; aralkyl amines such as benzyl amine; alkyl-substituted aralkyl amines such as methylbenzyl amine; alkyl-substituted aromatic amines such as alkyl-substituted anilines in which the alkyl group contains from 1 to 6 carbon atoms; and nitrogen heterocyclic compounds such as pyridine, morphline, quinoline, and the like.

The syntheses of the amine resins by addition of the amine group containing compound to the polybutadiene/acrylonitrile modified epoxy resins of this invention follow any of three general synthetic process known in the art. These include the conventional "stoichiometric amine" addition procedure, the "excess amine" procedure and the "diketimine" procedure.

In the conventional stoichiometric procedure, approximately stoichiometric amounts of the desired amine compound or compounds and the epoxide are combined in an inert, water-miscible organic solvent or an organic solvent mixture such as alcohol, methyl iso-butyl ketone, xylene, toluene, or glycol ethers, and gently heated to produce amine addition to the terminal epoxy groups of the epoxide compound. This procedure is well known in the art; see, for example, U.S. Pat. Nos. 3,984,299 and 4,031,050, the disclosures of which are incorporated herein by reference.

In the so-called excess amine procedure, approximately and 8- to 10-fold excess (on a molar basis) of the desired amine is combined with the epoxide compound in an aprotic, non-polar solvent and gently heated to effect addition of the amine to the terminal epoxy groups of the epoxide compound. In this procedure, the presence of excess amine promotes the addition of primary amines and suppresses the self-addition of the resulting amine resin to as yet unreacted epoxide compound. Upon completion of the reaction, the excess amine is removed by convention vacuum distillation or similar technique. This procedure is known in the art; see, for example, U.S. Pat. Nos. 4,093,594; 4,116,900; 4,134,864; and 4,137,140, the disclosures of which are incorporated herein by reference.

In the diketimine procedure, a polyamine is typically used where primary and secondary amine groups are protected as ketimine groups by prior reaction with a ketone. The secondary amine groups of the diketimine with the terminal epoxy groups of the epoxide compound. In this procedure, an amount of diketimine is used which is approximately stoichiometrically equivalent to the epoxy groups in the epoxide. The mixture is gently heated to effect the reaction, after which the remaining primary ketimine groups are removed by acid hydrolysis upon standing in aqueous acid. This procedure is known in the art; see, for example, U.S. Pat. No. 3,947,339, the disclosure of which is incorporated herein by reference.

Preparation of Principal Resin Emulsions

The principal resin emulsions of the present invention comprise a mixture of the foregoing amine resins, one or more cross-linking agents, and a solubilizing portion of aqueous acid. The preferred weight ratio of amine resins to cross-linking agents in the principal resin emulsions are from about 2:3 to about 5 1. The amount of water added to this combination of amine resins and cross-linking agents is an amount sufficient to provide a solids content of from about 10% to about 65% by weight.

Cross-Linking Agents

The cross-linking agents used in the principal emulsions of the present invention are blocked organic polyisocyanates or poly($\beta$-hydroxy or $\beta$-alkoxy)esters or other activated polyester compounds, aminoplast resins or phenoplast resins. In the practice of this invention, blocked organic polyisocyanates are preferred as the cross-linking agents.

All of these cross-linking agents are compounds which are stable at room temperature but, when heated, decompose into compounds which have functional groups which are highly reactive toward hydroxyl groups and amine groups. These cross-linking agents contain a multiple number of such blocked functional groups and react multiple times, upon heating, with the amine resins during curing or hardening so as to cross-link the resins into three-dimensional matrices.

Typical aminoplast and phenoplast resins which can be used as cross-linking agents in the practice of this invention are known in the art; see, for example U.S. Pat. No. 4,139,510, the disclosure of which is incorporated herein by reference.

Suitable aminoplast resins are compounds which are the reaction product of ureas and melamines with aldehydes which are further etherified with an alcohol. Examples of aminoplast components are urea, ethylene urea, thiourea, melamine, benzoguanamine, and acetoguanamine. Aldehydes which are useful for reaction with ureas and melamines to form these aminoplast resins include formaldehyde, acetaldehyde, and propionaldehyde. The reaction of the ureas or melamines with the aldehydes produce methylol compounds which can be used as such as cross-linking agents in the present invention. However, it is preferred that the methylol compounds be further etherified with alcohols prior to use as cross-linking agents. Suitable alcohols for etherification of the aminoplast methylols are monoalcohols of from 1 to 8 carbon atoms.

Suitable etherified aminoplast resins useful as cross-linking agents in the present invention include such compounds as methylol urea-formaldehyde resins, hexamethoxymethyl melamine, methylated polymeric melamine-formaldehyde resins, and butylated polymeric melamine-formaldehyde resins.

In general, aminoplast resins and their methods of preparation are described in detail in "Encyclopedia of Polymer Science and Technology," Vol. 2, pages 1-19, Interscience Publishers, (1965), which is incorporated herein by reference.

Phenoplast resins which are useful as cross-linking agents in the present invention include the reaction products of phenols and aldehydes which contain reactive methylol groups. The compositions can be monomeric or polymeric, depending upon the molar ratio of phenol and aldehyde used in the initial condensation reaction. Examples of phenols which can be used to make phenoplast cross-linking resins include o-, m-, or p-cresol, 2,4-xylenol, 3,4-xylenol, 2,5-xylenol, cardanol, p-tertbutylphenol, and the like. Aldehydes useful in this reaction are formaldehyde, acetaldehyde, and propionaldehyde. Particularly useful as phenoplast cross-linking resins are polymethylol phenols where the phenolic group is etherified with a lower alkyl group. Phenoplast resins and their methods of preparation are described in detail in the "Encyclopedia of Polymer Science and Technology," Column 10, pages 1–68, Interscience Publishers (1969), which is incorporated herein by reference.

Sufficient quantities of aminoplast and phenoplast resins are used in cathodic electrocoat compositions of the present invention to effect sufficient cross-linking of the polybutadiene/acrylonitrile modified epoxide resins upon baking or curing. Typically, the amount of aminoplast of phenoplast resin used in the practice of this invention is about 15 weight % to about 40 weight %, preferably between about 20 and 40 weight %.

The preferred cross-linking agents of this invention are organic polyisocyanates and, in particular, blocked polyisocyanates. The organic polyisocyanates and blocking agents used in the practice of this invention are typical of those used in the art; see, for example U.S. Pat. No. 4,182,831, the disclosure of which is incorporated herein by reference. Useful blocked polyisocyanates are those which are stable in the electrodeposition compositions and baths of this invention at ambient temperature but which unblock and react with the amine resins of this invention at elevated temperature.

In the preparation of blocked polyisocyanates useful as cross-linking agents in the practice of this invention, any suitable organic polyisocyanate can be used. Representative examples are aliphatic polyisocyanates such as trimethylene diisocyanate, tetramethylene diisocyanate, pentamethylene diisocyanate, hexamethylene diisocyanate, 1,2-propylene diisocyanate, 1,2-butylene diisocyanate, 2,3-diisocyanate, and 1,3-butylene diisooyanate, and mixtures thereof; the aliphatic-aromatic diisocyanates such as 4,4'-diphenylene methane diisocyanate, 2,4- or 2,6-tolylene diisocyanate, and mixtures thereof, 4,4'-toluidine diisocyanate, and 1,4-xylylene diisocyanate; the triisocyanates such as triphenylmethane-4,4',4"-triisocyanate, benzene-1,3,5-triisocyanate, and toluene-2,4,6-triisocyanate; and the tetraisocyanates such as 4,4'-diphenyldimethyl methane-2,2',5,5'-tetraisocyanate; the polymerized dimers and trimers, polymethylenepolyphenylene polyisocyanates having —N═C═O functionalities of 2 and 3 and the like.

In addition, the organic polyisocyanates can be prepolymers derived from a polyol such as glycols (e.g ethylene glycol and propylene glycol), as well as other polyols such as glycerol, trimethylolpropane, hexanetriol, pentaerythritol, and the like, as well as monoethers, such as diethylene glycol, tripropylene glycol and the like and polyethers, i.e. alkylene oxides that may be condensed with these polyols to form polyethers are ethylene oxide, propylene oxide, styrene oxide and the like. These are generally called hydroxyl-terminated polyethers and can be linear or branched. Especially useful are those derived by reacting polyols such as ethylene glycol, diethylene glycol, triethylene glycol, 1,4-butylene glycol, 1,3-butylene glycol, 1,6-hexanediol, and their mixtures, glycerol trimethylolethane, trimethylolpropane, 1,2,6-hexanetriol, pentaerythritol, sorbitol, methyl glucosides, sucrose and the like with alkylene oxides such as ethylene oxide, propylene oxide, their mixtures and the like.

Preferred polyisocyanates useful as cross-linking agents in the practice of this invention include the reaction product of toluene diisocyanate and trimethylolpropane and the isocyanurate of hexamethylene diisocyanate.

Any suitable aliphatic, cycloaliphatic, aromatic, alkyl monoalcohol or phenolic compound can be used as the blocking agent in the blocked polyisocyanate cross-linking agents. Examples include aliphatic alcohols such as methanol, ethanol, chloroethanol, propanol, butanol, pentanol, hexanol heptanol, octanol, nonanol, 3,3,5-trimethylhexanol, decanol, and lauryl alcohol; aralkyl alcohols such as phenylcarbinol, methylphenylcarbinol; ethylene glycol monomethyl ether, ethylene glycol monethyl ether, ethyleneglycol monopropyl ether, ethylene glycol monobutyl ether, and the like; phenolic compounds such as phenol and substituted phenols having substituents such as alkyl, alkoxy, halogen, nitro etc. which do not adversely affect the coating operation. Examples include cresol, nitrophenol, chlorophenol, and tert-butylphenol. A preferred blocking agent is ethylene glycol monopropyl ether.

Additional blocking agents include tertiary hydroxyl amines such a diethylethanolamine, and oximes such as methyl ethyl ketoxime, acetone oxime, cyclohexanone oxime, and caprolactam. A preferred oxime is methyl-n-amyl ketoxime.

The blocked polyisocyanates useful as cross-linking agents in the practice of this invention are formed by reacting sufficient quantities of blocking agent with the desired organic polyisocyanate under reaction conditions known in the art to produce a product devoid of free isocyanate groups when the reaction has run its course. Blocked polyisocyanates are generally known in the art and are described, for example, in U.S. Pat. Nos. 3,799,854; 3,984,299; 4,031,050; and 4,605,690, the disclosures of which are incorporated herein by reference. The preferred blocked organic polyisocyanate cross-linking agents useful in the practice of this invention are formed by the combination of an aliphatic polyol such as trimethylolpropane or pentaerythritol, a diisocyanate such as toluene diisocyanate, and a monoalcohol blocking group such as 2-ethylhexanol or ethylene glycol monopropyl ether. Such blocked polyisocyanates typically will deblock and react with the amino resins of this invention at temperatures of from about 125° C. to about 190° C.

The poly($\beta$-hydroxy) esters or activated poly esters useable as cross-linking agents in the practice of this invention are generally known as transesterification agents. These materials are polyesters which have alkylene glycol, alkylene glycol monoether, alkylene glycol monoester, or similar moieties as the esterifying group. Upon heating, the glycol portion of the ester is lost and the resulting acid moiety reacts with amine or alcohol groups of the amine resin to effect cross-linking.

Usually the polyester moiety of the $\beta$-hydroxy or $\beta$-activated esters will be a high molecular weight aliphatic polyacid. Examples generally are poly(2-hydroxyalkyl) esters of polycarboxylic acids. The polycarboxylic acids include, for example, azelaic acid, terephthalic acid, succinic acid, and aliphatic di- or tricarboxylic acids of 4 to 12 carbon atoms. The alcohol portion of the esters include such alcohols as ethylene glycol, glycerol, trimethylolpropane, pentaerythritol, and the like. These transesterification agents are known in the art; see, for example, U.S. Pat. Nos. 4,423,167; 4,423,169; 4,352,842; 4,362,847; 4,397,990; 4,401,774; 4,405,662; 4,405,703; and 4,489,182, the disclosures of which are incorporated herein by reference.

Pigment Grind Resins

The pigment grind resin formulations employed in the electrodeposition compositions of the invention are typical and generally known in the art. The pigment usually comprises carbon black and other pigmenting agents, such as titantium dioxide, strontium dioxide, and other pigments necessary for the production of the desired color. The grind resins are amine derivatives of epoxy resins of appropriate molecular weight which will permit the grind resins to function both as surfactant-like compounds to wet and incorporate the pigments into the composition and as resinous materials which will combine with the cross-linking agents in the final deposited film.

Typical grind resins useful in the practice of this invention include the quaternary ammonium salt grind resins generally disclosed in U.S. Pat. Nos. 3,925,180; 3,936,405; 3,962,165; 4,071,428; and 4,530,945; and the "castor oil" type of grind resins disclosed in U.S. Pat. No. 4,612,338, the disclosures of which are incorporated herein by reference.

The procedures, parameters, and conditions for the preparation of the pigment grind resin formulations and the proportions and amounts of ingredients necessary are those typically known in the art. As is appropriate, dibutyl tin oxide is also incorporated into pigment grind resin formulation. This ingredient is important for promotion of the cross-linking reaction upon baking or curing.

Electrodeposition Compositions

The aqueous electrodeposition compositions are formed from the principal emulsions, the pigment grind resin formulations and water to provide a solid content of from about 10% to about 65% by weight. The ratio of weights of the pigment grind resin formulations and the principal resin emulsions are from about 1:10 to about 4:10. The pH of the electrodeposition compositions may be from about pH 2 to about pH 8.5, and the ratio by weight of the amine resins to cross-linking agents in the electrodeposition compositions may be from about 2:3 to about 5:1. Likewise, the ratio of the pigment to pigment grind resins is from about 2:1 to about 6:1.

Generally, the principal resin emulsions and pigment grind resin formulations are combined to form the electrodeposition compositions shortly before use in the electrodeposition baths. The electrodeposition compositions may be further diluted with water and other components such as coalescing agents, anti-cratering agents, film build agents, surfactants, anti-pitting agents and the like to produce the electrodeposition baths. Sufficient quantities of the principal resin emulsions and pigment grind resin formulations are used so that the coating produced on the substrate will have sufficient thickness so as to provide such desired characteristics as a smooth surface, high film build and be effective in a low temperature curing step. In addition, the bath proportions of components should enable short coating time at a low temperature.

Electrodeposition Process

The electrodeposition process typically takes place in an electrically insulated tank containing an electrically conductive anode which is attached to a direct current source. The size of the tank will depend upon the size of the substrate article to be coated. Typically, the tank will be constructed of stainless steel or mild steel lined with a dielectric coating such as epoxy-impregnated fiberglass or polypropylene. The typical size of the electrodeposition tank for such articles as automobile or truck bodies will be designed to contain from about 240,000 liters to about 500,000 liters of electrodeposition bath.

Adjustment of the electrodeposition parameters such as voltage, time, bath temperature, percent solids content of the electrodeposition bath, pH of the bath, and the like will promote the deposition of a film having the desired characteristics. Typically, immersion for a period of about 1 to 4 minutes at a temperature of between about 80°–100° C. and at a DC voltage of from about 100 volts to about 500 volts in a bath having a solids content of from about 18% to about 30% provides smooth, durable, corrosion resistant films on the substrate article of a thickness of about 1.2 mils (0.0031 cm). Preferred values for these electrodeposition parameters are about 2 minutes immersion, 200–350 volts, 90° F. (32° C.), and 20% solids content.

After the film has been deposited in the substrate by the electrodeposition process, the film-coated article is removed from the dip tank and the excess bath solids are rinsed off. The film-coated substrate article is then passed through an oven where the film is cured an hardened. In general, the film-coated substrate bodies are heated to a temperature of from about 300° F. (149° C.) to about 400° F. (204° C.), preferably at from about 325° F. (163° C.) to about 350° F. (177° C.), for a period of from about 20 to 25 minutes to effect the hardening or cross-linking reaction in the film. During this process, the film viscosity of the resin systems decreases at the oven temperatures and the films of this invention flow so as to provide uniform coverage of the substrate body. As the cross-linking reaction proceeds, film flow ceases and the film begins to harden to produce the final cured film adhering to the substrate body. The hardened coating thicknesses produced in accordance with this invention lie in the range of from about 16 microns to about 36 microns.

The following examples are provided to enable one skilled in the art to practice the present invention. These examples are merely illustrative of the invention and are not to be read as limiting the scope of the invention as defined by the appended claims.

EXAMPLE 1

Principal Resin

A 3-liter, 3-necked flask was flushed with dry nitrogen and then charged with 250 g of a carboxyl-terminated polybutadiene/acrylonitrile random copolymer (CTBN) which had been end-capped by prior reaction with the diglycidyl ether of bisphenol A (WPE=344; available as WC-8006, Wilmington Chemicals). To this material was added 80 g of the diglycidyl ether of bisphenol A (WPE=186), 220 g of bisphenol A, and 93 g of toluene.

The mixture was reacted under conditions detailed above under the heading "General Synthetic Method for Preparing the Principal Resin". When the WPE of the reaction product had reached 1750, the mixture was cooled to room temperature. The final resin had a polybutadiene/acrylonitrile B block content of about 10%.

EXAMPLE 2

Principal Resin

Using the procedure of Example 1, the following materials were reacted to produce a principal resin having a polybutadiene/acrylonitrile B block content of about 15% and a final WPE of about 1800:
375 g of WC-8006 Epoxy-capped, carboxyl-terminated polybutadiene/acrylonitrile random copolymer having a WPE of 344;
420 g of 2,2-bis-[p-(3-Butoxy-2-glycidyloxypropyloxy)-phenyl]propane (WPE=334);
205 g of Bisphenol A;
90 g of toluene.

EXAMPLE 3

Principal Resin

Using the procedure of Example 1, the following materials were reacted to produce a principal resin having a polybutadiene/acrylonitrile B block content of about 15% and a final WPE of about 1250:
375 g of WC-8006 Epoxy-capped, carboxyl-terminated polybutadiene/acrylonitrile random copolymer having a WPE of 347.5;
187.5 g of the diglycidyl ether of bisphenol A
255 g of Bisphenol A;
87 g of toluene.

EXAMPLE 4

Principal Resin

Using the procedure of Example 1, the following materials were reacted to produce a principal resin having a polybutadiene/acrylonitrile B block content of about 15% and a final WPE of about 1200:
375 g of WC-8006 Epoxy-capped, carboxyl-terminated polybutadiene/acrylonitrile random copolymer having a WPE of 347.5;
187.5 g of the diglycidyl ether of resorcinol (WPE=125; available as WC-69 from Wilmington Chemicals);
125 g of Hydroquinone;
85 g of toluene.

EXAMPLE 5

Amine Resin

The principal resin prepared in Example 1 was mixed with 63 g of N-methylethanolamine and the temperature of the resulting exothermic reaction was kept below about 115° C. with cooling. When the exothermic reaction had subsided, the mixture was heated for an additional one hour at a temperature of about 100°-110° C. At the end of this time, the mixture was cooled and 335 g of methyl iso-butyl ketone was added and the product is removed from the reaction vessel and allowed to cool to room temperature.

EXAMPLE 6

Amine Resin

Using the procedure of Example 5, the principal resin of Example 2 was converted to an amine resin by reaction with 412 g of N-methylethanolamine. The final product was taken up in 335 g of methyl iso-butyl ketone.

Example 7

Amine Resin

Using the procedure of Example 5, the principal resin of Example 3 was converted to an amine resin by reaction with 61 g of N-methylethanolamine. The final product was taken up in 300 g of methyl iso-butyl ketone.

EXAMPLE 8

Amine Resin

Using the procedure of Example 5, the principal resin of Example 4 was converted to an amine resin by reaction with 63 g of N-methylethanolamine. The final product was taken up in 350 g of methyl iso-butyl ketone.

EXAMPLE 9

Blocked Diisocyanate Cross-Linking Agent

The primary cross-linking agent was prepared by slowly charging 870 parts of trimethylolpropane into a suitable reactor vessel containing 3387 parts of an 80/20 isomer mixture of 2,4- and 2,6-toluene diisocyanate, 1469 parts of methyl iso-butyl ketone, and 2 parts of dibutyl tin dilaurate under agitation with a nitrogen blanket. The reaction mixture was maintained at a temperature below about 110° F. (43° C.). The charge was held an additional one and one-half hours at 110° F. (43° C.) and then heated to 140° F. (60° C.) at which time 2026 parts of ethylene glycol monopropyl ether was added. The charge was maintained at 210° F. (99° C.) to 220° F. (104° C.) for one and one-half hours until analysis by infrared spectroscopy indicated the absence of —N=C=O functionality. The batch was then diluted by the addition of 2116 parts of methyl iso-butyl ketone.

EXAMPLE 10

Blocked Diisocyanate Cross-Linking Agent

An 80/20 mixture of 2,4- and 2,6-toluene diisocyanate (2949 parts) was charged to a suitable reaction vessel under a dry nitrogen atmosphere. 2-Ethylhexanol (2209.4 parts) was added to the vessel with agitation at such a rate to keep the reaction mixture at a temperature below about 120° F. (49° C.). After addition was complete, the mixture was stirred at this temperature until an isocyanate equivalent weight of 285-325 was obtained (about thirty minutes). Dibutyl tin dilaurate (0.9 parts) was added to the reaction vessel contents and the mixture was heated to 150° F. (66° C.). Trimethylolpropane (264.7 parts) was added at a suitable rate to keep the temperature of the reaction mixture below about 250° F. (121° C.). After addition was complete, the mixture was heated at 250° F. (121° C.) for an additional one and one-half hours. At the end of this time, the mixture was cooled and diluted by the addition of 2282.4 parts of methyl iso-butyl ketone and 253.6 parts of n-butanol.

EXAMPLES 11

Castor Oil Grind Resin

The pigment grind vehicle was prepared by additing the following components to a suitable reactor vessel: 2280 parts of Iris (glycidyl ether) of castor oil Epi-Rez ® 505 (WPE=600), manufactured by Celanese Corp., Louisville, Ky., and a mixture of 331 parts of ethylene glycol monobutyl ether and 619 parts of polyglycolamine H-163. This mixture was heated at 77° C. for one and one-half hours. The mixture was heated to 115° C. for an additional one hour and then cooled to room temperature.

EXAMPLES 12

Pigment Paste

A pigment paste was prepared by grinding at ambient temperature 123 parts of the pigment grind resin of Example 11, 8 parts of glacial acetic acid, 252 parts of deionized water, 4 parts of dibutyl tin dioxide, 17 parts of carbon black, 56 parts of lead silicate, and 145 parts of clay in a suitable mill for about one-half hour until the average particle size was determined to be less than about 12 microns.

EXAMPLE 13

Grind Vehicle

A. Ethylene glycol monopropyl ether (52 parts) and toluene diisocyanate (87 parts) were charged to a reaction vessel under a dry nitrogen blanket and stirred at a temperature of below about 100° F. (38° C.) for a period of one and one-half hours.

B. In a suitable reactor vessel, 455 parts of an alkylaryl polyether alcohol (Triton® X-102, manufactured by Rohm & Haas, Philadelphia, Pa.) and 51 parts of methyl iso-butyl ketone (previously azeotroped to remove water), were added to 109 parts of 2,4-toluene diisocyanate. The resulting reaction mixture was maintained at 115° F. (46° C.) for two hours. At the end of this time, 56 g of N,N-dimethyl ethanolamine were added to the reaction mixture, and the resulting mixture was heated at 160° F. (71° C.) for one hour. Finally, 50 parts of ethylene glycol monobutyl ether, 75 parts of lactic acid, and 89 parts of deionized water were added, and the reaction mixture held at 190° F. (88° C.) for one hour.

C. The grinding vehicle was prepared by charging 88 parts of the adduct from step A to a reaction vessel containing 206 parts of diepoxy adduct of bisphenol A and its bis-glycidyl ether, EPON® 1002F (WPE=650, manufactured by Shell Chemical Co., Houston, Tex.) and 39 parts of methyl iso-butyl ketone. The reaction temperature was maintained at 250° F. (121° C.) for one hour. Ethylene glycol monobutyl ether (186 parts) and the adduct from step B (381 parts) were added. The resulting mixture was maintained at 180° F. (82° C.) for four hours, and then cooled for use.

EXAMPLE 14

Pigment Paste

A pigment paste was prepared by grinding 1081.1 parts of the grind vehicle from Example 13, 2,208.5 parts of deionized water, 1,947.4 parts of clay, 272 parts of carbon black, 341.4 parts of lead silicate, and 77.6 parts of dibutyl tin dioxide in a steel ball mill for 15 minutes. Strontium chromate (172.4 parts) was blended into the mill and the resulting mixture was ground for twenty-four hours, after which time the average particle size was determined to be 16 microns. An additional portion of 324.8 parts of the grind vehicle from the previous Example was added, together with 116.8 parts of deionized water and the resulting mixture was ground for an additional three hours.

EXAMPLES 15-18

Principal Emulsions

The amine resins of Examples 5-8 were used to make principal emulsions of Example 15-18. In each case, the amine resin (550 g non-volatile resin content) was mixed with 350 g of the cross-linking agent of Example 9. Acetic acid (80 g, 25% aqueous solution) was added and the resulting mixture stirred for fifteen minutes. Water (600 g) was slowly added to the mixture with vigorous stirring. The resulting mixture is sheared for 60 minutes and then 800 g of water are added with mild stirring. The final emulsions contained about 36% by weight resin solids. These emulsions were used to prepare electrocoat bath compositions.

EXAMPLES 19-22

Electrocoat Baths

The principal emulsions prepared as detailed in Examples 15-18 were used to make electrocoat bath compositions. In each case emulsion, containing 577.5 g of non-volatile resin content, was further diluted with 1000 g of water and the pigment paste of Example 14 (222.5 g non-volatile solids content) was slowly stirred in. The resulting baths were further diluted with about 1000 g of water to produce final electrocoat baths having a solids content of about 20% by weight.

EXAMPLES 23-26

Electrocoating Procedures

Steel panels of 12 inches (30.5 cm)×4 inches (10.2 cm) dimensions were electrocoated using, separately, each of the coating baths of Examples 19-22 under the following conditions:

| Bath temperature | 80–100° C. |
|---|---|
| Current | 1 Ampere |
| Voltage | 300 volts |
| Immersion time | Minutes |

The coated panels were cured at a temperature of 325° F. (163° C.) for 25 minutes to produce final film thicknesses on the steel panels of about 1.2 mil (0.0031 cm).

EXAMPLES 27

Corrosion Tests

The corrosion resistance of electrocoat films of the present invention were compared in two separate tests with those of two prior art electrocoat films which did not contain the polybutadiene or polybutadiene/acrylonitrile B blocks. Corrosion resistance was measured using the General Motors "Scribe Creep" test. In this test, coated steel panels are scratched using an awl and then subjected to several cycles of immersion in a salt-water bath, exposure to heat, cold, and humidity. The surface paint layer which has been loosened from the panel surface by corrosion is removed, and the lateral width of the corrosion about the scribe por scratch line is measured at several points along the scratch. The average width of this "creep" of the corrosion away from the scratch line is reported as the "scribe creep" for the particular coating. The results of these tests are given in Tables 3 and 4.

TABLE 3

| | Corrosion Test 1 | | | | | |
| | Average Scribe Creep (mm) | | | | | |
| | Prior Art | Prior Art | Coating Made From Resin of Example | | | |
| Substrate | Coating 1 | Coating 2 | 1 | 2 | 3 | 4 |
| Bare, cold-rolled steel | 6.50 | — | 4.60 | 4.17 | — | — |
| Phosphated, cold-rolled steel | 1.54 | — | 1.22 | 13.6 | — | — |
| Phosphated, hot-dipped steel | 0.82 | — | 1.02 | 0.94 | — | — |

TABLE 4

| | Corrosion Test 2 | | | | | |
| | Average Scribe Creep (mm) | | | | | |
| | Prior Art | Prior Art | Coating Made from Resin of Example | | | |
| Substrate | Coating 1 | Coating 2 | 1 | 2 | 3 | 4 |
| Bare, cold-rolled steel | 8.29 | 9.40 | — | 5.65 | 6.21 | 5.88 |
| Phosphated, cold-rolled steel (phosphate coating 1) | 6.93 | 7.04 | — | 5.68 | 5.76 | 5.62 |
| Phosphated, cold-rolled steel (phosphate coating 2) | 6.88 | 4.49 | — | 5.88 | 5.28 | 4.66 |
| Hot-dipped, galvinized steel | 2.10 | 2.83 | — | 2.62 | 1.80 | 1.79 |
| Phosphated, hot-dipped galvanized steel | 1.62 | 2/30 | — | 1.76 | 1.89 | 1.86 |

Examination of the data presented in Tables 3 and 4 show that the corrosion resistance data for films formed of the compositions of the present invention match or exceed that of typical prior art electrocoat films. The effects are most pronounced for cold-rolled steel and phosphated cold-rolled steel.

EXAMPLE 28

Reverse Impact Tests

Panels coated with two typical prior art electrocoat films and coated with films formed in accordance with the teachings of this invention were subjected to reverse impact tests using ASTM D-2794-84, "Standard Test Method for Resistance of Organic Coatings to the Effects of RApid Deformation (Impact)." In this test, a weight is dropped against a rod which has a ball-shaped rounded end which rests against a coated steel panel. The impact deforms the panel, and the adherence of the film coating to the side opposite impact is observed.

In these tests, the Prior Art Coating 1 failed to adhere at an impact of about 40 ft-lb, while Prior Art Coating 2 failed at about 140–150 ft-lb. The coatings prepared in accordance with this invention did not fail at the limit of the testing device, 160 ft-lb.

EXAMPLE 29

Mandrel-Bend Tests

Panels coated with two typical prior art electrocoat films and coated with films formed in accordance with the teachings of this invention were subjected to a conical mandrel bend test, ASTM D-522-60, "Elongation of Attached Organic Coatings with Conical Mandrel Apparatus." In this test, film-coated panels are bent over a conically shaped mandrel so that the panel and film are subjected to a sharp radius of bending at one end of the mandrel and bending at increasing radii along the mandrel. The damage to the film, if any, is greatest at the small radius bend. The length of delaminated film from the side of the coated panel having the small radius bend is measured. In this test, panels coated with Prior Art Coating 1 had an average length of delamination of 5 mm, Prior Art Coating 2, 12 mm, and the films made in accordance with the teachings of this invention exhibited no delamination.

We claim:

1. A resin comprising a mixture of
   (i) an epoxy/diol copolymer which is the reaction product of a diol and one or more diepoxides; and
   (ii) an A-B-A block copolymer wherein
       A represents blocks of an epoxy/diol copolymer which is the reaction product of a diol and one or more diepoxides; and
       B represents blocks of an epoxy capped, carboxyl-terminated polybutadiene or polybutadiene/acrylonitrile copolymer.

2. A resin as defined in claim 1 having a weight per epoxide (WPE) of between about 1000 and 3000.

3. A resin as defined in claim 2 having a weight per epoxide (WPE) of between about 1200 and 1600.

4. A resin as defined in claim 1 wherein said B blocks comprise from about 5% to about 25% by weight, based on total resin.

5. A resin as defined in claim 1 wherein said B blocks comprise about 15% by weight, based on total resin.

6. A resin as defined in claim 1 wherein said diol is selected from the group consisting of compounds of the formula HO—Ar$^1$—OH and HO—Ar$^2$—OH
   wherein Ar$^1$ denotes two or more aromatic carbocyclic rings which are fused, are connected by a valence bond, or are connected by a branched or unbranched divalent alkylene group containing from 1 to 3 carbon atoms or carbonyl and wherein Ar$^1$ is unsubstituted or further substituted with alkyl of from one to four carbon atoms, alkoxy of from one to four carbon atoms, phenyl, alkylphenyl in which the alkyl group contains from one to four carbon atoms, or halogen; and
   Ar$^2$ denotes a divalent phenylene group or divalent phenylene group substituted with alkyl, alkoxyl of from one to four carbon atoms, phenyl alkylphenyl in which the alkyl group contains from one to four carbon atoms, or halogen.

7. A resin as defined in claim 6 wherein said diol is selected from the group consisting of compounds of the formula HO—Ar$^1$—OH
   wherein Ar$^1$ denotes two or more aromatic carbocyclic rings which are fused, are connected by a valence bond, or are connected by a branched or unbranched divalent alkylene group containing from 1 to 3 carbon atoms or carbonyl and wherein Ar$^1$ is unsubstituted or further substituted with alkyl of from one to four carbon atoms, alkoxy of from one to four carbon atoms, phenyl, alkylphenyl in which the alkyl group contains from one to four carbon atoms, or halogen.

8. A resin as defined in claim 7 wherein said diol is selected from the group consisting of bisphenol A, 4,4'-dihydroxybiphenyl, and 4,4'-dihydroxybenzophenone 9. A resin as defined in claim 6 wherein said diol is selected from the group consisting of compounds of the formula HO—Ar$^2$—OH wherein Ar² denotes a phenylene group or phenylene group substituted with alkyl, alkoxyl of from one to four carbon atoms, phenyl, alkylphenyl in which the alkyl group contains from one to four carbon atoms, or halogen.

10. A resin as defined in claim 9 wherein said diol is selected from the group consisting of resorcinol, hydroquinone, and 2-phenylhydroquinone.

11. A resin as defined in claim 1 wherein said diepoxide is selected from the group consisting of E¹ and E² and mixtures thereof
wherein diepoxide E¹ has the structure

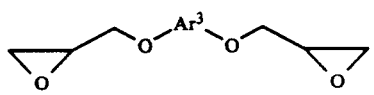

wherein Ar³ is selected from the group consisting of Ar¹ and Ar² as defined above; and diepoxide E² has the structure

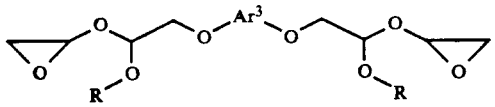

wherein Ar³ is selected from the group consisting of Ar¹ and Ar² as defined above and R is alkyl of from one to six carbon atoms or alkoxyalkyl of from two to eight carbon atoms.

12. A resin as defined in claim 11 wherein said diepoxide is selected from compounds of the formula E¹.

13. A resin as defined in claim 12 wherein said diepoxide is selected from the group consisting of the diglycidyl ether of bisphenol A and the diglycidyl ether of hydroquinone.

14. A resin as defined in claim 11 wherein said diepoxide is selected from compounds of the formula E².

15. A resin as defined in claim 14 wherein said diepoxide is 2,2-bis-[p-(3-butoxy-2-glycidyloxypropyloxy)phenyl]propane.

16. A resin as defined in claim 1 wherein said epoxy-capped, carboxyl-terminated B blocks have a number average molecular weight of about 3000–4000.

17. A resin as defined in claim 1 wherein said epoxy-capped, carboxyl-terminated B blocks comprise from 0–40% acrylonitrile.

18. A resin as defined in claim 17 wherein said epoxy-capped, carboxyl-terminated B blocks comprise from 10–20% acrylonitrile.

19. A resin comprising a mixture of
(i) an epoxy/diol copolymer which is the reaction product of a diol and one or more diepoxides; and
(ii) an A-B-A block copolymer wherein
A represents blocks of an epoxy/diol copolymer which is the reaction product of a diol and one or more diepoxides; and
B represents blocks of an epoxy-capped, carboxyl-terminated polybutadiene.

20. A resin defined in claim 19 having a weight per epoxide (WPE) of between about 1000 and 3000.

21. A resin as defined in claim 20 having a weight per epoxide (WPE) of between about 1200 and 1600.

22. A resin as defined in claim 19 having from about 5% to about 25% B block content, based on total resin.

23. A resin as defined in claim 22 having about 15% B block content, based on total resin.

24. A resin as defined in claim 19 wherein said diol is selected from the group consisting of compounds of the formula HO—Ar¹—OH and HO—Ar²—OH
wherein Ar¹ denotes two or more aromatic carbocyclic rings which are fused, are connected by a valence bond, or are connected by a branched or unbranched divalent alkylene group containing from 1 to 3 carbon atoms or carbonyl and wherein Ar¹ is unsubstituted or further substituted with alkyl of from one to four carbon atoms, alkoxy of from one to four carbon atoms, phenyl, alkylphenyl in which the alkyl group contains from one to four carbon atoms, or halogen; and
Ar² denotes a phenylene group or phenylene group substituted with alkyl, alkoxyl of from one to four carbon atoms, phenyl, alkylphenyl in which the alkyl group contains from one to four carbon atoms, or halogen.

25. A resin as defined in claim 24 wherein said diol is selected from the group consisting of compounds of the formula HO—Ar¹—OH
wherein Ar¹ denotes two or more aromatic carbocyclic rings which are fused, are connected by a valence bond, or are connected by a branched or unbranched divalent alkylene group containing from 1 to 3 carbon atoms or carbonyl and wherein Ar¹ is unsubstituted or further substituted with alkyl of from one to four carbon atoms, alkoxy of from one to four carbon atoms, phenyl, alkylphenyl in which the alkyl group contains from one to four carbon atoms, or halogen.

26. A resin as defined in claim 25 wherein said diol is selected from the group consisting of bisphenol A, 4,4'-dihydroxybiphenyl, and 4,4'-dihydroxybenzophenone.

27. A resin as defined in claim 24 wherein said diol is selected from the group consisting of compounds of the formula HO—Ar²—OH
wherein Ar² denotes a phenylene group or phenylene group substituted with alkyl, alkoxyl of from one to four carbon atoms, phenyl, alkylphenyl in which the alkyl group contains from one to four carbon atoms, or halogen.

28. A resin as defined in claim 27 wherein said diol is selected from the group consisting of resorcinol, hydroquinone, and 2-phenylhydroquinone.

29. A resin as defined in claim 19 wherein said diepoxide is selected from the group consisting of E¹ and E² and mixtures thereof
wherein diepoxide E¹ has the structure

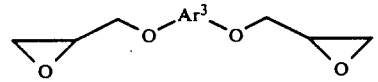

wherein Ar³ is selected from the group consisting of Ar¹ and Ar² as defined above; and E² has the structure

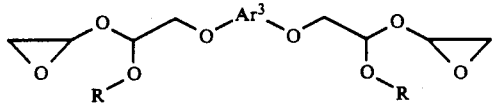

wherein Ar³ is selected from the group consisting of Ar¹ and Ar² as defined above and R is alkyl of from one to six carbon atoms or alkoxyalkyl of from two to twelve carbon atoms.

30. A resin as defined in claim 29 wherein said diepoxide is selected from compounds of the formula $E^1$.

31. A resin as defined in claim 30 wherein said diepoxide is selected from the group consisting of the diglycidyl ether of bisphenol A and the diglycidyl ether of hydroquinone.

32. A resin as defined in claim 29 wherein said diepoxide is selected from compounds of the formula $E^2$.

33. A resin as defined in claim 32 wherein said diepoxide is 2,2-bis-[p-(3-butoxy-2-glycidyloxypropyloxy)-phenyl]propane.

34. A resin as defined in claim 19 wherein said epoxy-capped, carboxyl-terminated B blocks have a number average molecular weight of about 3000–4000.

* * * * *